United States Patent [19]

D'Alayer de Costemore d'Arc

[11] Patent Number: 5,109,313
[45] Date of Patent: Apr. 28, 1992

[54] DRYING CASSETTE FOR RECORDER/PLAYER UNITS

[75] Inventor: Stephane M. D'Alayer de Costemore d'Arc, Brussels, Belgium

[73] Assignee: Staar S.A., Brussels, Belgium

[21] Appl. No.: 437,096

[22] Filed: Nov. 16, 1989

[30] Foreign Application Priority Data

Dec. 5, 1988 [BE] Belgium .................... 8801367

[51] Int. Cl.[5] .................... G11B 5/10; G11B 23/02
[52] U.S. Cl. .................... 360/128; 360/132
[58] Field of Search .................... 360/128, 129, 132, 137

[56] References Cited

U.S. PATENT DOCUMENTS

| | | | |
|---|---|---|---|
| 2,114,494 | 4/1938 | Hummel et al. | 21/2 |
| 2,493,067 | 1/1950 | Goldsmith | 219/39 |
| 3,284,611 | 11/1966 | Laing et al. | 219/370 |
| 3,439,922 | 4/1969 | Howard | 274/47 |
| 3,674,980 | 7/1972 | Cox | 219/367 |
| 3,860,959 | 1/1975 | Kudou | 360/84 |
| 3,997,919 | 12/1976 | Thompson | 360/137 |
| 4,034,164 | 7/1977 | Westmoreland | 179/100.1 |
| 4,230,932 | 10/1980 | Mikamo et al. | 219/370 |
| 4,635,156 | 1/1987 | D'Alayer | 360/132 |
| 4,674,000 | 6/1987 | Lee | 360/128 |
| 4,777,548 | 10/1988 | Dow et al. | 360/96.5 |
| 4,803,583 | 2/1989 | Bogdanski | 360/128 |
| 4,811,149 | 3/1989 | Clausen | 360/128 |

FOREIGN PATENT DOCUMENTS

| | | |
|---|---|---|
| 894699 | 10/1982 | Belgium . |
| 2524091 | 2/1976 | Fed. Rep. of Germany . |
| 2519699 | 4/1976 | Fed. Rep. of Germany . |
| 61-71409 | 4/1986 | Japan . |

OTHER PUBLICATIONS

Computer Technology Review, No. 2, May 1984, Los Angeles, U.S. *pp. 19-22; Mike Dunningan: "5.25-In. Fixed/Removable Disk Products Resolve Data Integrity Problems", p. 19, right-hand column, line 26—p. 20, middle column, line 17; FIGS. 1, 2*.

Primary Examiner—A. J. Heinz
Assistant Examiner—Jefferson Evans
Attorney, Agent, or Firm—Leydig, Voit & Mayer

[57] ABSTRACT

A drying cassette for circulating drying air over internal components of a player/recorder unit is contained within a cassette housing similar to a conventional tape cassette, and is self powered or may be powered from a spindle within the player/recorder unit. A fan within the cassette housing generates forced air, and an outlet opening in the cassette housing directs the forced air toward the internal components, in particular the rotating drum and magnetic head assembly of conventional VCR units. A combined cleaning and drying cassette is also disclosed.

23 Claims, 11 Drawing Sheets

DRYING CASSETTE FOR RECORDER/PLAYER UNITS

TECHNICAL FIELD

The present invention relates to a method and apparatus for drying components of tape recorder/player units and, more particularly, apparatus for drying the surfaces of rotating magnetic heads and associated parts used for the recording and/or playback of signals in video cassette player/recorder units when the parts have a liquid substance on their surfaces due to condensation, or as a result of cleaning with liquid.

BACKGROUND

It is well known that recorder/player units have a serious propensity to be damaged or the magnetic tape used therein to be destroyed, as well as some parts of their mechanism such as the rotating magnetic head assembly when the latter or more precisely the drum of the assembly has its very smooth surface covered even slightly with a liquid substance such as condensation, or cleaning liquid (i.e. alcohol).

This liquid substance once in contact with the magnetic tape, which is wrapped around the rotating drum for record or playback purposes, causes an almost instantaneous sticking of the tape on the rotating drum which results in the unwinding of the tape at the rotational speed of the drum which is in the order of 1500 to 1800 rotations per minute in a video or digital recorder.

Owing to the size of the diameters of these rotating parts (from 50 to 100 millimeters) it is easy to understand that in fractions of seconds, a significant length of the magnetic tape is wrapped around the drum. This produces the following drawbacks: the magnetic tape is unwound outside the cassette and around the different parts of the mechanism and thereafter cannot be rewound in the cassette; the unit must be brought to a service center to be fixed; the magnetic heads, which are extremely sensitive parts protruding from the drum periphery of a few microns, are generally damaged by the magnetic tape entangled around the drum; the magnetic tape even if not torn apart is so damaged that the recordings become useless and are lost.

These phenomena of condensation and dew, noticeable for home video recorders when they undergo sudden changes of temperature (outside/inside a home) are frequently encountered in the case of portable video units which are either connected to a camera or incorporate such a camera. Very frequently these units undergo sudden and large changes of climate, temperature, humidity such as, for instance, when going inside or outside rooms or vehicles.

In the case of portable camera/recorder units when they undergo sudden changes of temperature, as when they are carried into a warm, humid inside environment from outside (cold), for example, moisture will condense on parts such as the rotating magnetic head. Portable video units are frequently equipped with a "dew detector" which indicates by means of a warning lamp, that it is advisable not to operate the video unit and the warning lamp remains "on" as long as the condensation nearby the video head has not returned to an acceptable level, when the detector then switches off the warning lamp.

As can be understood if such a detector warns the user not to operate the video unit to avoid damaging the video head as well as the tape and other components of the unit, it does not bring any solution to the long delay, generally between 15 and 30 minutes, before the video unit becomes dry enough for the user to operate the unit.

Such a waiting period can be very annoying as usually the user desires to operate the portable video unit without delay.

This sensitivity to sudden changes of temperature, dew conditions, and climate conditions limits the convenience of use of portable units.

Furthermore, for all video units it is recommended to wait for about 15 minutes before inserting a magnetic tape after the use of a cleaning cassette involving the use of a liquid (i.e. alcohol), which is most efficient to clean the heads.

U.S. Pat. No. 4,635,156, commonly assigned, describes such a cleaning cassette in which the problem of delay before the video unit may be used is partly solved by intermittently wetting the tape.

It can be understood, therefore, that it would be important to avoid the above-described problems, in order to protect the magnetic tapes as well as the video recorders/player units and particularly, their most sensitive parts (heads, drum) and allow as much as possible use without delay of portable units.

SUMMARY OF THE INVENTION

Accordingly, the main object of the invention is to overcome the above-cited drawbacks and to provide a simple, reliable, economical and easy to operate device for drying moisture on the surfaces of internal components of recorder/player units.

Another object of the invention is to provide a cassette with elements mounted therein which generate forced drying air thereby providing a drying cassette which is easily and conveniently handled by any user and may be loaded into a recorder/player unit to perform a drying function.

Another object of the invention is to utilize devices commonly found in any recorder/player unit to automatically actuate powered elements of the drying cassette as an incident to loading the cassette into a player/recorder unit.

Another object of the invention is to include in the drying cassette a mechanism or a control circuit ensuring the automatic actuation and stopping of the powered elements which may include an electric motor mounted within the drying cassette to operate a fan which circulates air over the internal components of the recorder/player unit.

Still another object of the invention is to combine in a single cassette a cleaning-tape system and powered drying elements in order to carry out with one cassette the drying of internal components of a recorder/player unit after a cleaning cycle.

Another, more specific, object of the invention is to provide a combined cleaning and drying cassette which includes a control to ensure that sections of the cleaning tape are used sequentially, without rewinding the tape so that each cleaning operation is carried out with a fresh portion of cleaning tape.

BRIEF DESCRIPTION OF THE DRAWINGS

Additional features and advantages of the invention will become apparent from the following detailed description taken in conjunction with the accompanying drawings in which.

DETAILED DESCRIPTION OF THE INVENTION

Figure 22:
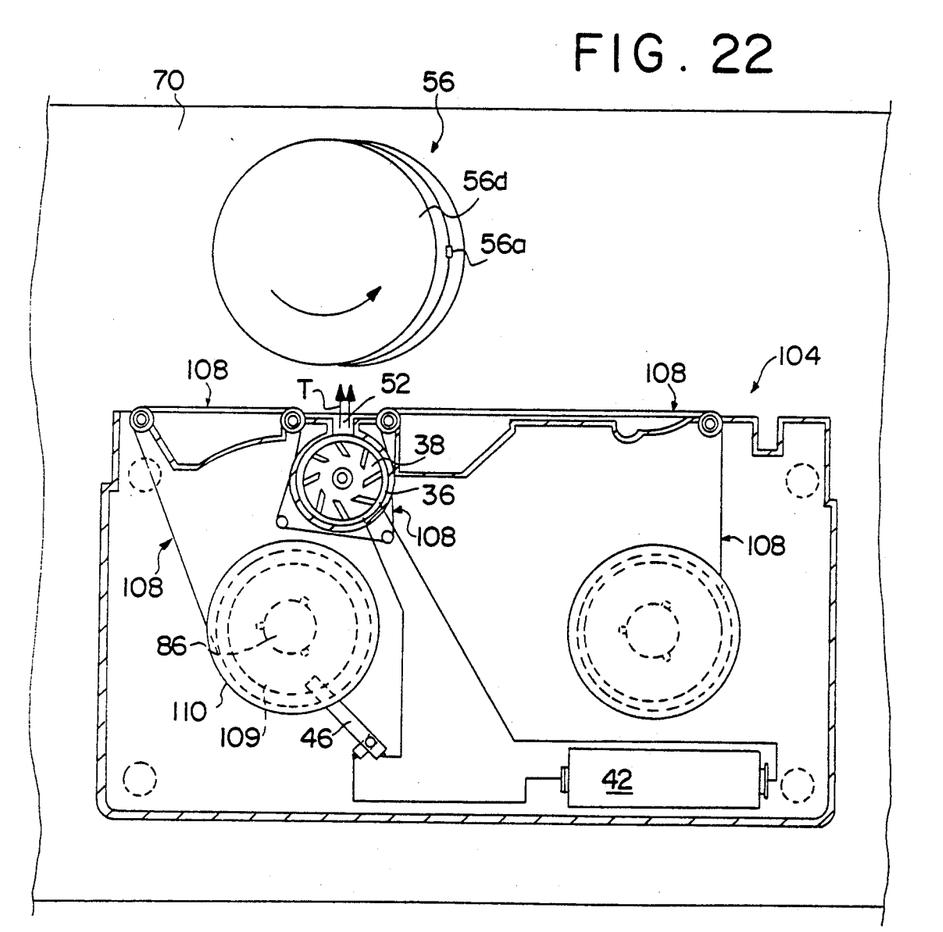
FIG. 22 is similar to FIG. 3 and illustrates a combined cleaning and drying cassette according to the present invention.

To illustrate the invention, different drying cassette embodiments have been illustrated in player/recorder units where they may be located by a user to carry out a drying operation. FIG. 22, in addition, discloses a combined cleaning and drying cassette which is capable of performing both operations.

Figure 1:
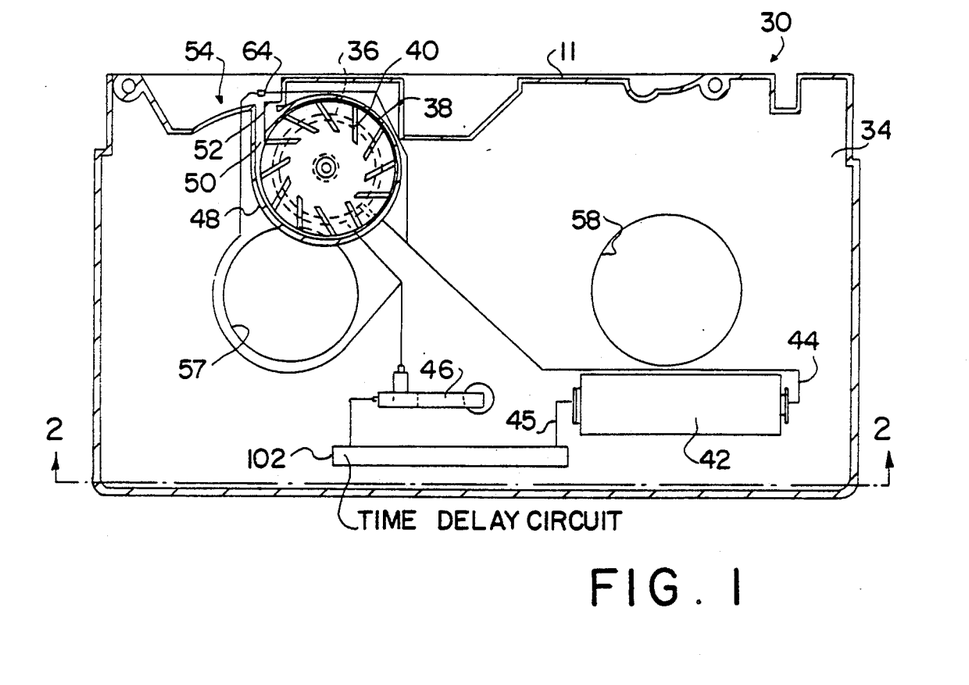
FIG. 1 is a schematic plan view of a drying cassette according to the invention provided with a motor actuated fan where the upper part of the cassette housing has been removed, and is taken substantially along the line 1—1 in FIG. 2.
Figure 2:
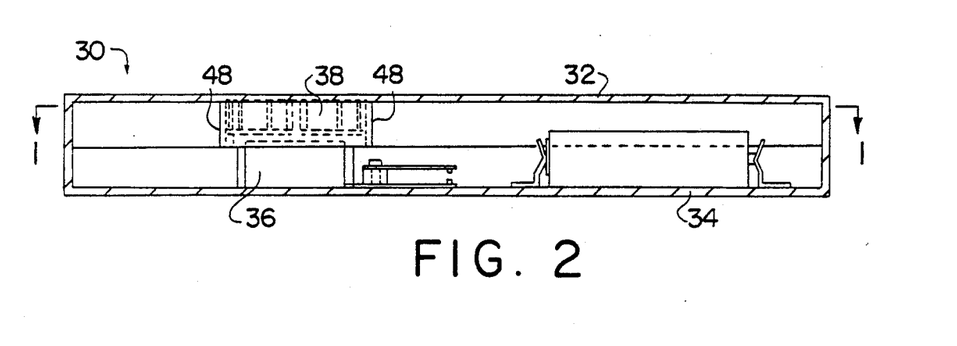
FIG. 2 is a sectional side view of the drying cassette illustrated at FIG. 1 taken substantially along with the line 2—2 in FIG. 1 which view illustrates the cassette including the upper part of the cassette housing.

Turning, therefore, to FIGS. 1 and 2, a drying cassette 30 constructed according to the present invention is illustrated as having a cassette housing with an exterior shape substantially the same as a conventional VHS video tape cassette available commercially. Such a cassette housing has a top part 32 and a bottom part 34 (FIG. 2) joined together by means of glue, screws, or plastic soldering of studs.

In keeping with the invention, to generate forced air for drying, the bottom part 34 of the cassette housing has mounted therein an electric motor 36 with a shaft which rotates a fan 38 provided with blades 40. The drying cassette in this embodiment is self powered, and for this purpose the motor 36 is actuated by a battery 48 also mounted in the bottom part 34 of the cassette housing. A bracket, not illustrated for reasons of simplicity, may be provided in order to secure the battery 42. The battery 42 is connected to the terminals of the electric motor 36 by two wires 44, 45 one of which includes a switch 46 fixed to the bottom part 34 of the cassette housing.

In order to direct forced air generated by the fan 38 toward internal components of a player/recorder unit in which the drying cassette 30 is positioned, walls 48 forming a housing around the fan 38 and an outlet duct 50 are positioned by gluing or soldering on the inside of the top part 32 to direct the forced air generated by the rotation of the fan 38. An outlet opening 52 for forced air is provided in the side wall 54 of the cassette housing which faces the internal components to be dried, and at such a location that the forced air generated by the fan 38 is carried in a path T laterally spaced from the center line of the housing and reaches the surface of the internal components such as the rotating magnetic head assembly 56 with the greatest efficiency. This opening 52 is connected to the housing created by the walls 48 around the fan 38 by the way of the duct 50 which in this case is tangent to a circular cavity around the fan blades 40 to obtain the best performance of the fan 38.

The elements within the cassette housing are positioned in such a way that they do not impede loading of the drying cassette 30 to an operating position immediately adjacent the magnetic rotating head assembly 56 and the automatic insertion of the tape guides and driving spindles, normally provided for a standard cassette, within openings 57, 58 in the drying cassette housing which openings are shown to be substantially centered in each half of the cassette housing. In the arrangement shown in FIG. 1, the battery 42 is mounted in one half of the housing while the rotor of the fan 38 and the motor 36 are mounted in the other half of the housing. The loading of the drying cassette 30 may be carried out by a conventional loading device, such as a pivotally mounted loading door shown in later figures, or a slide in slot type mechanism, represented schematically in FIGS. 3-11, which moves the driving spindle and unlocking pins into the cassette as a incident to the loading movement.

Figure 6:
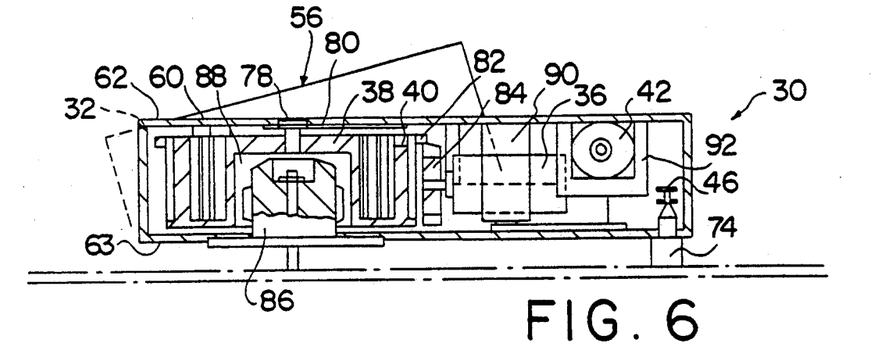
FIG. 6 is a view similar to FIG. 4 of the drying cassette illustrated in FIG. 5.
Figure 8:
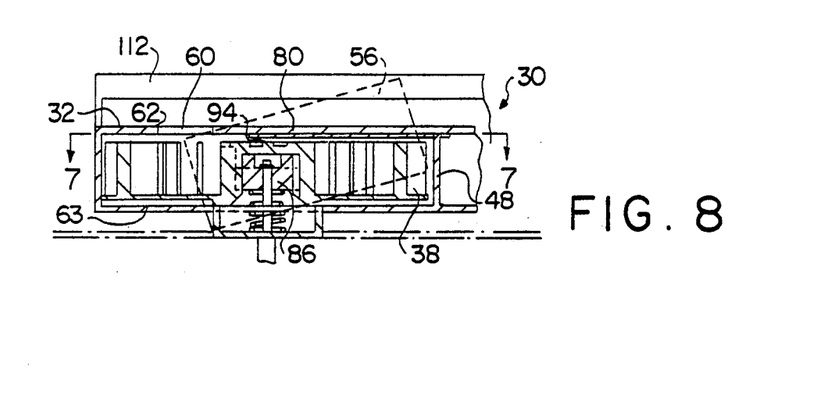
FIG. 8 is a sectional view taken along the line 8—8 of the drying cassette embodiment illustrated in FIG. 7.

For air inlets to the fan 38, openings 60 are provided in the top wall 62 of the cassette housing, which openings 60 are clearly shown in FIGS. 6 and 8, it being understood that said openings 60 could also be provided in the side wall 54 or in the bottom wall 63 of the cassette housing at an appropriate location with respect to the nature of the fan 38 that is used. Such openings 60 may also be advantageously fitted with filtering devices (not shown) in order to prevent large particles of dust from being blown on the rotating magnetic head assembly 56.

To further enhance the drying effectiveness of the drying cassette 30, inside or nearby the duct 50 or the outlet opening 52, a resistance heating element 64 (FIG. 1) is provided for heating the forced air from the fan 38. This resistance heating element 64 may be connected to the motor power supply circuit so as to be also actuated by the switch 46.

Figure 3:
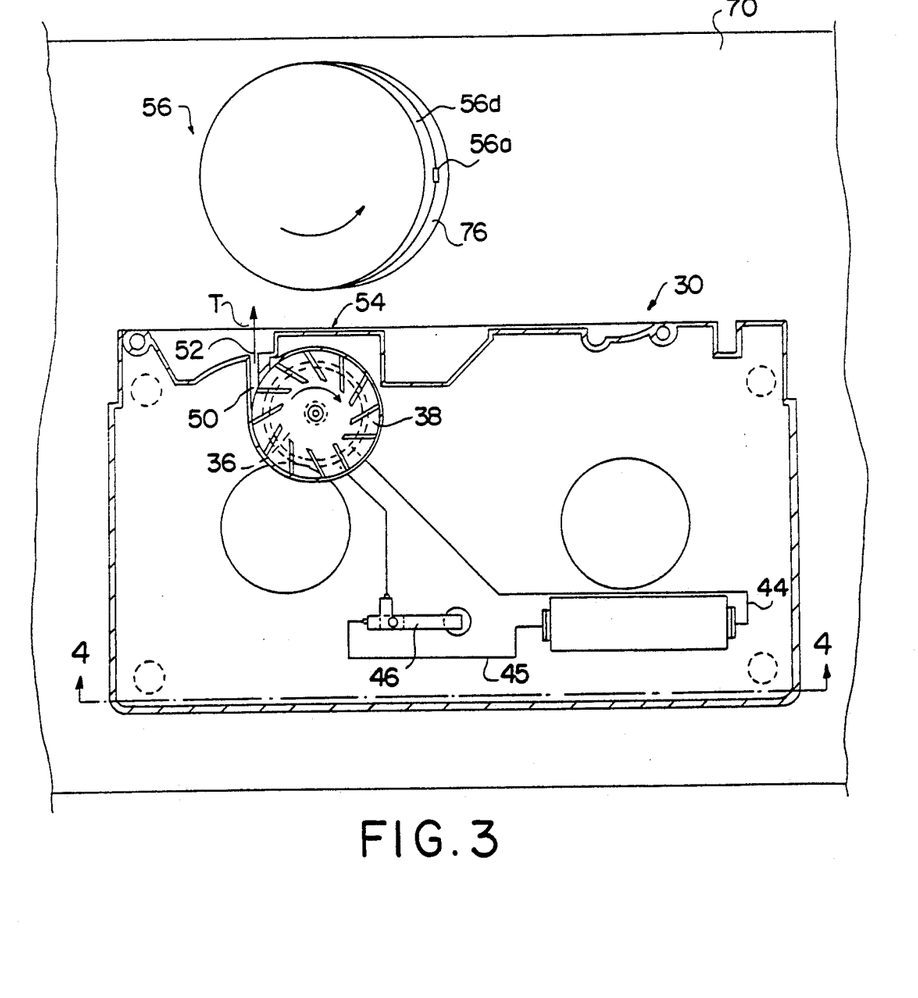
FIG. 3 is a view similar to FIG. 1 showing the drying cassette in a predetermined operating position in a tape recorder player unit.

Referring now to FIG. 3, the drying cassette 30 is shown in operating position in a tape recorder/player unit immediately adjacent the rotating head assembly 56. Assembly 56 including the rotating tape drum 56d is the only component shown of the various internal components of the unit, and is schematically represented in order to assist comprehension of the figures.

The player/recorder unit comprises, among other elements, a frame 70 on which are mounted all the parts required for cooperation with the drying cassette 30, including supports 72 ensuring the correct support and positioning of a drying cassette 30 in operating position as well as an unlocking pin 74 which, in case of a conventional unit, unlocks the magnetic tape reels to allow their rotation. The rotating drum 56d is mounted on a fixed support 76 on the frame 70 and carries the magnetic heads 56a. These magnetic heads 56a are positioned so as to slightly protrude from the lateral surface of the rotating drum 56d (several hundredths of a mm) in order to contact the magnetic tape when the tape wraps around the rotating drum 56d and the fixed support 76, the tape being guided in height by the fixed support. The magnetic heads 56a and the rotating drum 56d are rotated by an electric motor, not shown here, which is usually placed coaxially within the fixed support 76. As clearly shown, the rotating drum 56d has a well defined inclination with respect to the frame 70.

To control the operation of the drying cassette automatically as it is loaded to the operating position, the unlocking pin 74 commonly found in tape recorder/player units, is advantageously used for closing the switch 46 and thus connecting a power supply to the electric motor 36 and the heating element 64 (if mounted in the drying cassette).

Figure 4:
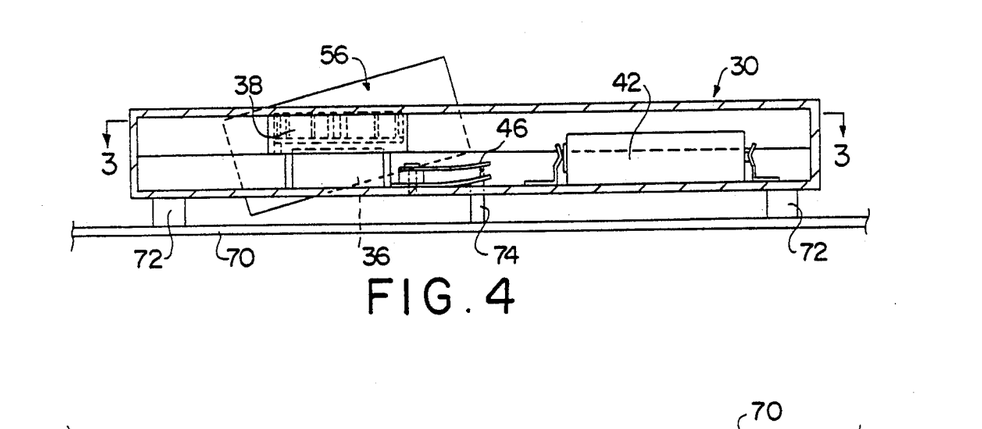
FIG. 4 is a view similar to FIG. 2, the drying cassette being in the operating position illustrated in FIG. 3.

To operate the drying cassette of this first embodiment of the invention, the user inserts the drying cassette into the loading mechanism of the video unit and the loading mechanism of the video unit loads the drying cassette to the operating position on the supports 72. The switch 46 is automatically closed thereby connecting the electric motor 36 and the resistance element 64 to the source 42, and thus warm air is blown by the fan 36 towards the rotating head assembly 56. Air flow is represented by the arrows T.

To ensure a more efficient drying process, it is recommended that the user set the unit in play mode so that the rotating drum 56d and the magnetic heads 56a turn at their standard speed.

After the completion of the drying process, the drying cassette 30 is ejected, simultaneously the switch 46 is opened, and the user can therefore extract the drying cassette, which is ready for another use.

Various embodiments are represented in the following figures, in which the same reference numbers used previously designate the same elements.

Figure 5:
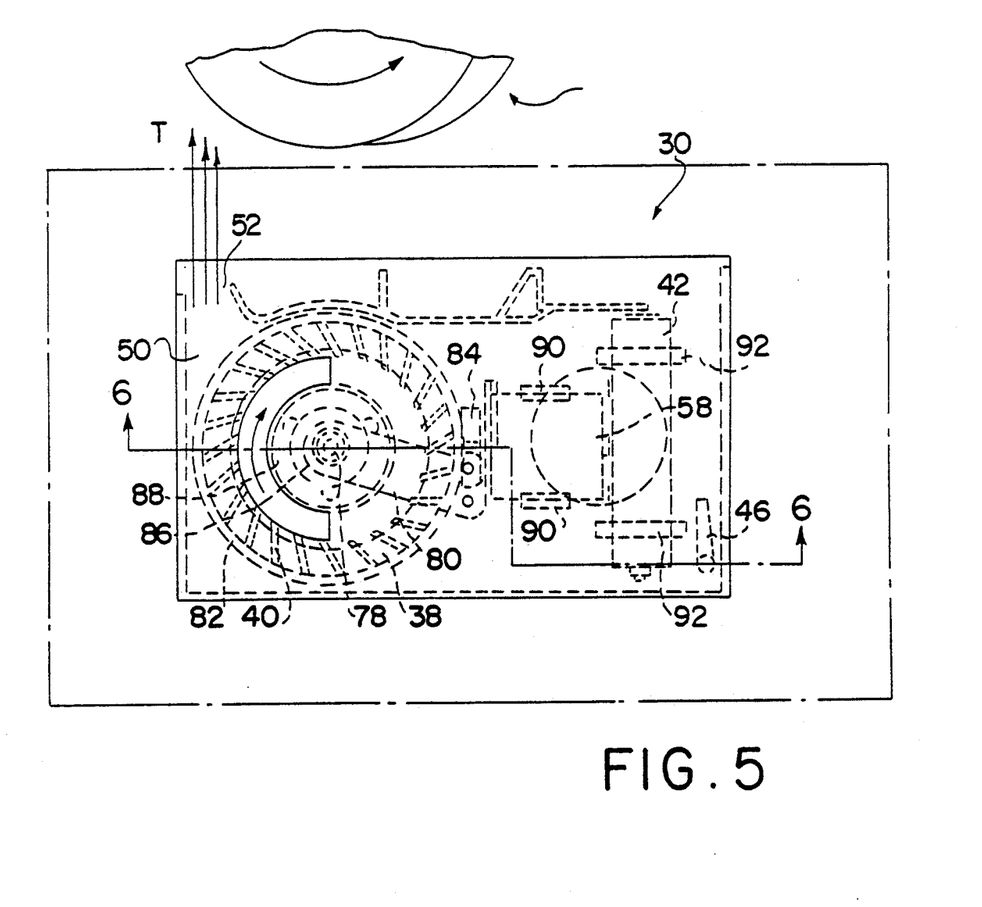
FIG. 5 is a view similar to FIG. 3 of another embodiment of the invention.

FIGS. 5 and 6 shown schematically another embodiment of the above-described invention where the drying cassette 30 is placed in operating position inside a video camera recorder unit and has an exterior shape substantially corresponding to a VHS-C cassette, well known in the field of video camera recorders.

This drying cassette contains a fan 38 provided with blades 40 rotating around an axle 78 which is held by a curved leaf spring 80. A face of the curved leaf spring 80 leans on the inner surface of the top part 32 of the cassette housing and serves to maintain the lower edge of a rim 82 of the fan 38 in contact with a rubber wheel 84 fixed on the shaft of a small electric motor 36.

In order to permit the fan 38 to rotate completely independently of the drive spindle 86 of camera recorder unit, a central part of the fan 38 is provided with a recess 88 into which the reel spindle 86 of the recorder/player unit penetrates. The shape of the recess 88 is such that the fan 38 does not contact the reel spindle 86 and therefore allows the fan 38 and the reel spindle 86 to rotate independently.

The electric motor 36 is fixed on the inner side of the top part 32 of the cassette housing by means of straps 90 and is powered by a battery 42 held by a pair of U-shaped braces 92. An opening in the case, not represented here, permits removal and introduction of the battery 42. To assist in understanding of the figures, the electric wiring has not been represented bu is essentially identical to the arrangement shown in FIGS. 1, 2, 3 and 4; a switch 46 shown with its contacts closed, is connected in the wiring to actuate the motor 36 from the source when the unlocking pin 74 enters the cassette as previously described. The high speed of rotation of the electric motor 36 spins the fan 38 and the blades 46 which blow air outside the drying cassette through a duct 50 and an outlet opening 52 (see arrows T).

Figure 7:
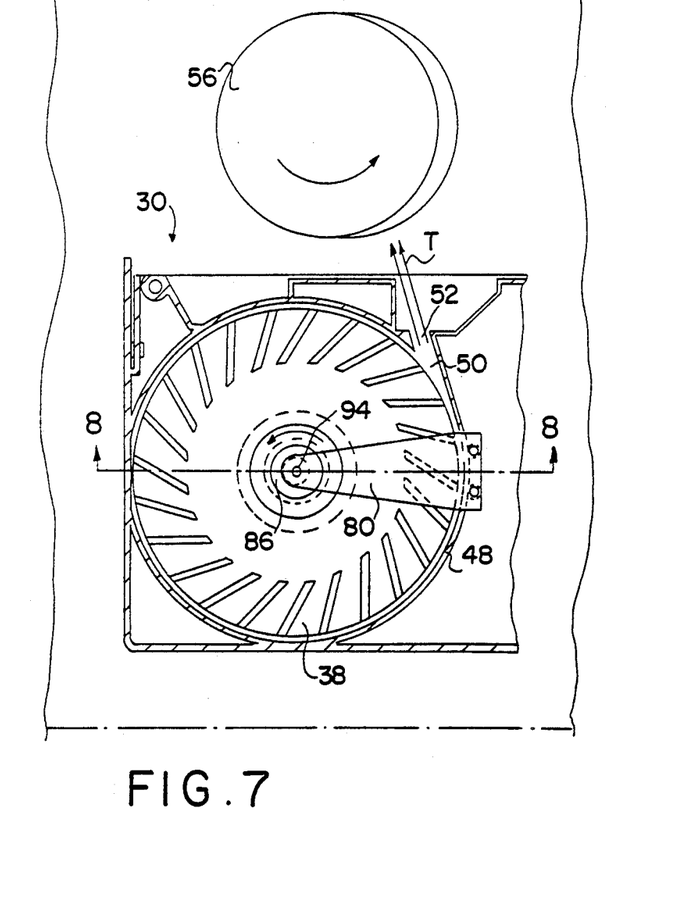
FIG. 7 is a fragmentary-view of another embodiment of drying cassette according to the invention in the operating position illustrated in FIGS. 3 and 5.

Referring now to FIGS. 7 and 8 which represent schematically another embodiment of the invention in operating position, shown as a drying cassette having a housing of essentially the VHS format, a large-sized fan 38 is directly rotated by the reel spindle 86 of the VCR unit located in front of the rotating head assembly 56. The fan 38 is free in rotation and is supported by the reel spindle 86 but is, however, submitted to a downward pressure and is held on the reel spindle 86 by a leaf spring 80, one extremity of which is in contact with a projection 94 at the center of the fan 38 and the other extremity of which is fixed to the inside face of the top part 32 of the cassette housing. Openings 60 are located in the top part 32 and serve as inlets for air to the fan 38. Walls 48 are located around the fan 38 and form the outlet duct 50 through which air is blown and ejected via the outlet opening 52 toward the rotating head assembly 56 (see arrows T). To operate this embodiment of drying cassette, once in operating position, the "Fast Rewind" control of the unit is actuated.

Figures 9, 10:
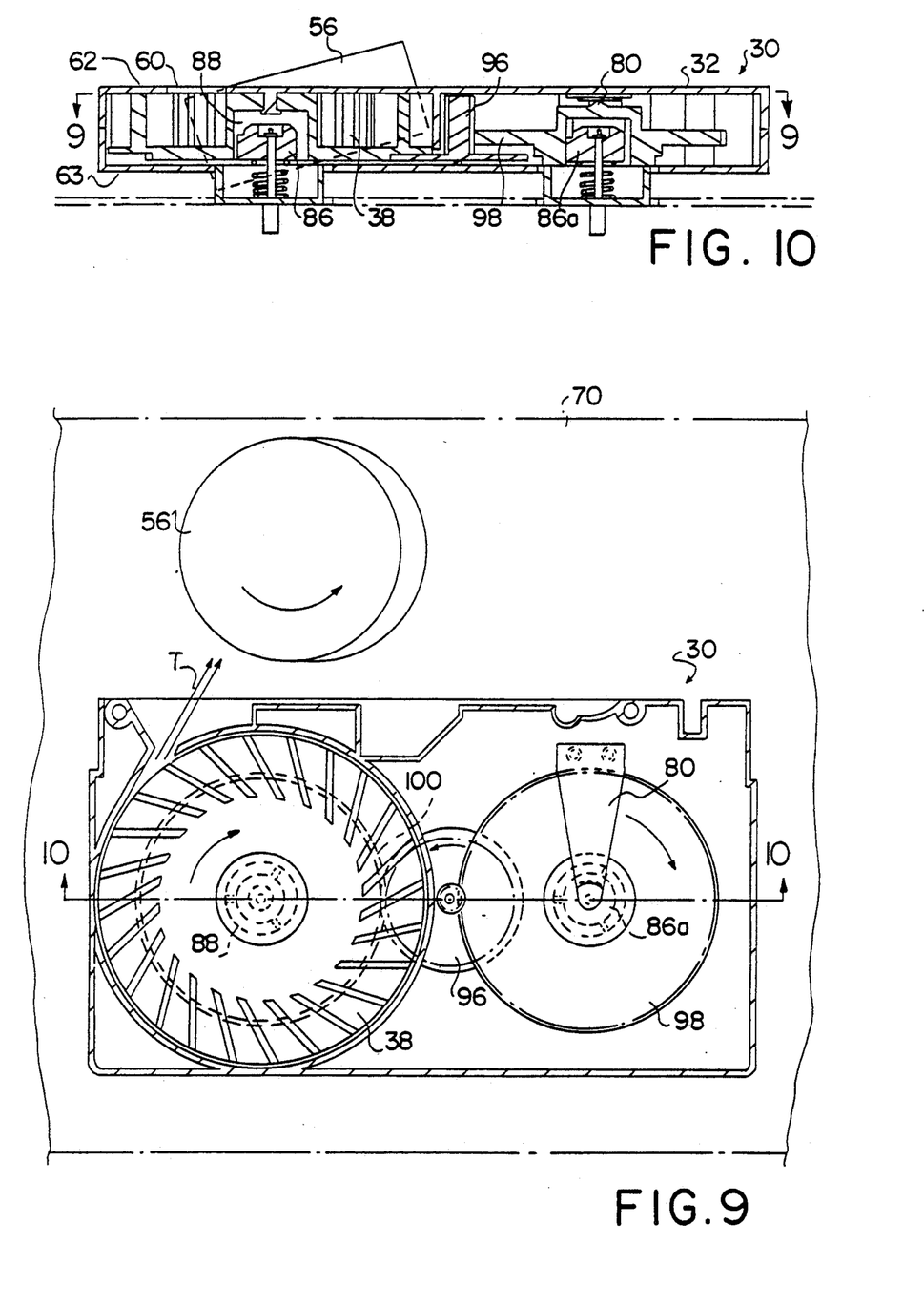
FIG. 9 is a view similar to FIG. 3 of another embodiment of drying cassette, taken substantially along the line 9—9 in FIG. 10.
FIG. 10 is a view similar to FIG. 4, of the drying cassette illustrated at FIG. 9 taken substantially along the line 10—10 in FIG. 9.

Another embodiment of the invention is represented schematically in FIGS. 9 and 10 which illustrate a drying cassette 30 similar to a VHS cassette. In this embodiment, when in operating position in a unit as show in FIGS. 9 and 10, the fan 38 is driven by the second reel spindle 86a of the unit through an intermediate double gear 96 and a drive gear 98. The second reel spindle 86a rotates the drive gear 98, which is rotationally free of the cassette housing being supported by the reel spindle 86a but resiliently and firmly kept in contact against reel spindle 86a by a leaf spring 80 similar to the one shown in FIGS. 7 and 8. The spindle 86a has ridges and the drive gear 98 has a central grooved recess which receives the spindle 86a and is driven thereby. The drive gear 98 engages a small-sized gear of the double gear 96 which has a second large gear which engages a toothed rim 100 on the fan 38. This gear drive provides an increase in the rotational speed of the fan 38 relative to the speed of the spindle 86a so that the fan 38 blows air towards the rotating head assembly 56 (arrows T) with a greater efficiency. The fan 38 has a central recess 88 which receives the first reel spindle 86, but the shape and size of the recess is such that the fan 36 rotates independently of the reel spindle 86. Once this embodiment of the cassette is in operating position the "Fast Forward" control of the unit is actuated to operate the drying cassette.

It is not intended to limit the invention to the embodiments of FIGS. 7, 8, 9 and 10 because a drying cassette may be provided having a fan 38 upon or adjacent the second reel spindle 86a of the video unit.

Further in keeping with the invention, the switching off of the drying sequence may be manually operated by the user or automatically operated after a predetermined time, triggered by the sensing of the absence of magnetic tape.

It is preferable to provide such a drying cassette with an electrical or mechanical stop device which switches off, after a predetermined time, the power supply to the electric motor 36, and, if installed, the heating element 64. For this purpose, as schematically illustrated in FIG. 1, a time delay circuit 102 (for example, LM 555 of National Semi-Conductor Corp.) is incorporated which switches off the power supply after the lapse of a predetermined time interval (i.e. 40 seconds). This circuit may also be used for actuating a warning light or signal to inform the user that the drying process has come to an end and that the drying cassette can be removed. Well known mechanical means, like gear trains, may also be used which, after a given number of rotations of the primary gear (meshing with one of the reel spindles of the unit), ensures the opening of a switch placed within the power supply line. Furthermore, the battery 42 may be replaced with a small-sized battery pack which can be charged whether by an AC adaptor or by an electric wire which connects the battery pack with an exterior source of electric current. In this latter case, care must be taken not to have the electric wires damaged by the cassette loading mechanism of the unit.

Referring now to FIG. 22, in carrying out the invention a combined cleaning and drying cassette 104 is provided which is operative to dry internal components of recorder/player units after a cleaning cycle.

To obtain the best drying action upon the surface of the rotating magnetic head assembly 56 this embodiment of the invention takes into account different factors including the path followed by the cleaning tape 108 which has to be modified as compared with known cleaning cassettes so that the cleaning tape travels behind the housing of the fan 38 so as not to block the outlet opening 52; the cleaning tape 108 being thicker and rougher than an ordinary magnetic tape, prevents the drum 56d and the magnetic heads carried thereby from rotating.

To account for such factors, and allow the free rotation of the rotating drum 56a after the stopping of the cleaning tape 108 and during the drying operation, an automatic mechanical clutch 109 such as described in commonly assigned Belgian patent No. 894,699 can be advantageously used.

In this embodiment of the invention, particularly suited for a VHS video unit, the clutch 109 is mounted on the tape reel 110 which cooperates with the unwinding reel spindle 86, as this reel spindle 86 ensures the winding of the cleaning tape 108 inside the cassette. As the tape reel 110 is unclutched from the reel spindle 86 and thus is free to rotate before the cleaning tape 108 is stopped, the cleaning tape 108 is slackened and during the rewind operation it leaves the surface of the rotating drum 56a without slowing its rotation. The tape reel 110 is thereafter driven counter-clockwise by the reel spindle 86 of the unit for ensuring the rewinding of the cleaning tape 108 around the tape reel 110. Simultaneously, the automatic clutch 109 power closes the switch 46 and thus the drying process is powered while the rotating drum 56d and the magnetic heads 56a continue to rotate by inertia, which ensures a better drying of them.

Figure 7A:
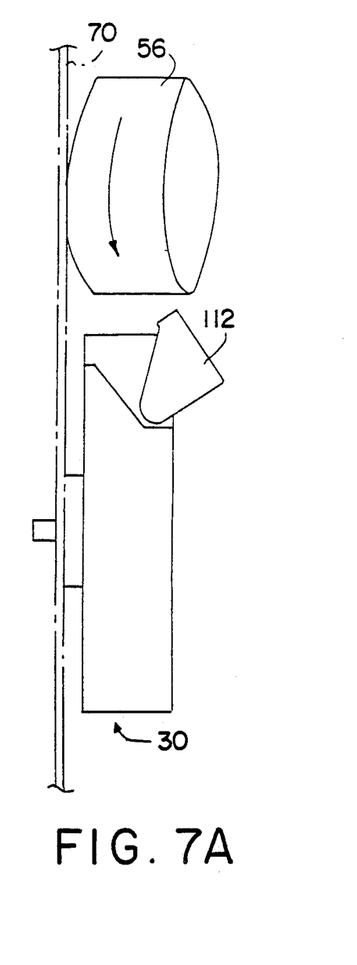
FIG. 7A is a side view of a drying cassette in operating position in a player/recorder unit, showing a cassette housing having a front-edge door in an open position.

The drying of the playback/recording unit components can be still further improved by installing in the cassette housing deflectors which will direct the air flow generated by the fan 30 in a more accurate way. In this respect the inner face of the door 112 (see FIGS. 7 and 7A), which in every standard cassette case protects the magnetic tape, will act as a flow director when the door is in the open position.

Turning now to FIGS. 11–15, another embodiment of the invention is illustrated. In this embodiment, the components of a drying cassette are mounted within a housing corresponding substantially to a standard VHS tape cassette and an electric motor 36 drives a fan 38 at approximately 5000 rpm. The electric motor 36 is powered by a battery 42 which may be inserted into the cassette housing through an opening, not illustrated for simplicity, provided in the housing. The battery 42 is connected to the terminals of the electric motor 36 by two wires 44, 45 one of which includes a switch 46 fixed to the cassette housing so that it will be actuated upon insertion of the cassette in the loading mechanism of a VCR unit.

Figure 11:
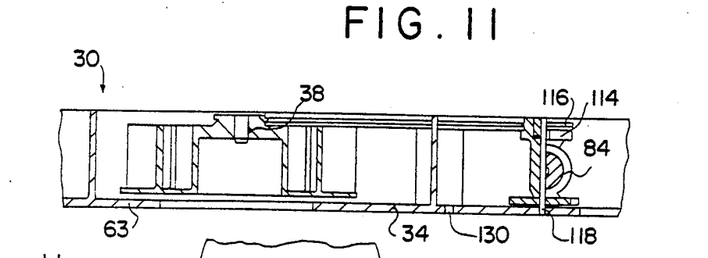
FIG. 11 is a fragmentary sectional side view of another embodiment of drying cassette according to the invention taken substantially along the line 11—11 in FIG. 12.
Figure 12:
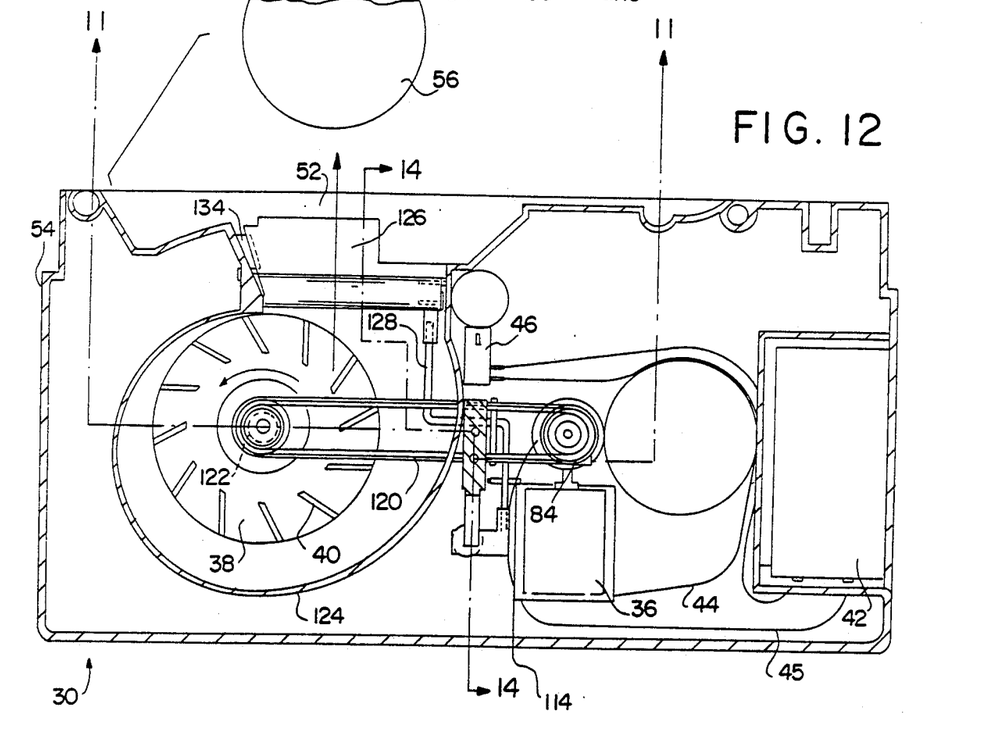
FIG. 12 is a schematic plan view of the drying cassette illustrated in FIG. 11.
Figure 13:
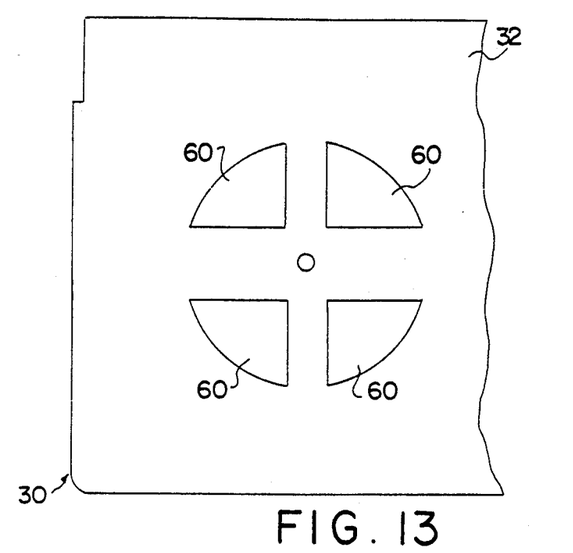
FIG. 13 is a fragmentary view of a portion of a drying cassette housing illustrating air inlet openings.

The motor 36 which is horizontally mounted on the bottom part 34 of the cassette housing bears a rubber wheel 84 on its output shaft which rotates a disc 114 mounted on a vertical axis and bearing at its other extremity a pulley 116. The disc is urged against the rubber wheel 84 by an elastic member 118. A belt 120 connects the pulley 116 to a pulley 122 fixed on the fan 38. The fan 38 is enclosed in a spiral-shaped casing 124.

Drying air is drawn into the casing 124 and given an acceleration by the rotating impellers 40 carried by the fan 38 and emerges from the casing 124 at the outlet opening 52 provided in the side wall 54 of the cassette housing. The opening 52 is located as close as feasible to the part to be dried (FIG. 12) and shaped in such a way that the air flow reaches the surface of the rotating head assembly 56, where that is the principle part to be dried, with the greatest efficiency.

It is important to locate the components of the drying cassette within the housing in such a way that they do not impede the correct setting of the cassette housing in operating position within a VCR unit, and allow the spindles which ensure in a standard cassette the driving of the magnetic tape to rotate freely.

To admit drying air inside the cassette housing, holes 60 (FIG. 13) are provided in the top part 32 of the cassette housing air supply to the fan, it being understood that the holes 60 could also be provided in the side wall or in the bottom part of the cassette housing at appropriate location with respect to the nature of the fan 38 that is used. Such holes 60 may also be advantageously fitted with filtering devices in order to prevent particles of dust from being blown on the rotating head assembly 56. To heat the drying air inside the outlet opening 52, a resistance heating may be mounted to obtain more efficient drying of the element (not shown) rotating head assembly. This resistance element may be connected to the motor power supply circuit so as to be also actuated by the switch 46.

To direct the air at a specific location, pivotable blades 126 are provided and located in the path of the airflow in the opening 52. Pivotal movement of the blades 126 is controlled by a rod 128 which is powered by an unlocking pin 74 conventionally positioned on the frame of tape recorder player apparatus for unlocking the tape reels within a cassette.

Figure 14:
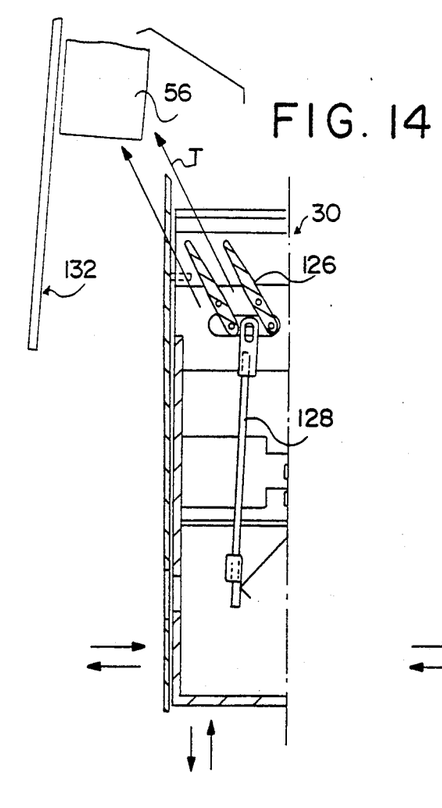
FIG. 14 is a fragmentary sectional side view of the drying cassette shown in FIG. 12 taken substantially along the line 14—14 in FIG. 12 with the drying cassette in an operating position in a player/recorder unit with the loading door open.
Figure 15:
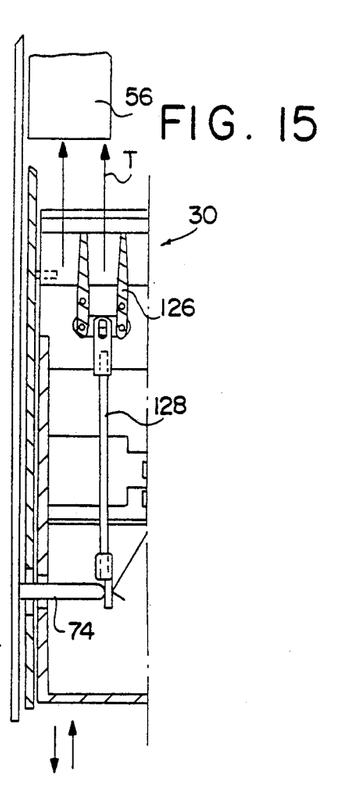
FIG. 15 is a sectional view similar to FIG. 14 illustrating air guide members in a different position and the drying cassette in an operating position in a player/recorder unit with the loading door closed.

FIGS. 14 and 15 illustrate the drying cassette in two different operating positions. Only the video head of a VCR unit is schematically represented in order to facilitate comprehension and interpretation of the Figures. FIG. 15 represents the cassette as shown at FIG. 12, set in operating condition inside an appropriate, tape recorder/player unit.

As shown in FIG. 15, and mentioned previously, the unlocking pin 74 may be used for shifting the pivotal blades 126 to a horizontal position. A metallic guiding tongue as found on the loading shelf of conventional tape recorder/player units actuates a switch 46 for supplying power to the electric motor 36 and the heating resistance (if mounted in the drying cassette). The switch 46 is positioned inside a groove out into the bottom part 34 of the cassette housing.

To use the drying cassette of this embodiment, the cassette is placed in the loading mechanism of the video unit and this mechanism carries the drying cassette to operating position. In the course of such movement, the switch 46 is closed by the guiding tongue and the unlocking pin 74 brings the pivotable blades to a horizontal position; the electric motor 36 and the heating resistance are powered and thus warm air is blown by the fan 38 straight toward the rotating head 56 and dries the head rapidly and efficiently.

FIG. 14 represents the drying cassette inserted in the guides provided in the access door 132 of a camcorder unit when the door 132 is in open position. It illustrates the proper inclination of the pivotable blades 126; an abutment 134 (FIG. 12) is provided for limiting the tilting movement of the blades 126.

In camcorders, it has been found advantageous to operate the drying cassette in such position as it picks up air having the characteristics of the environment in which the camcorder is going to be used in order to reduce drastically the "drying" time. In addition, in some commercially available camcorders, when the dew detector of such units is powered, an inserted cassette is automatically ejected and a new loading operation prevented by a safety circuit operative as long as the dew level is higher than a preset value.

Therefore, in such units, in carrying out the invention the drying cassette is operated in an operating position remote from the rotating heads; in this remote operating position the pivotable blades 126 properly direct the airflow towards the rotating heads 56.

Figures 16, 17, 18:
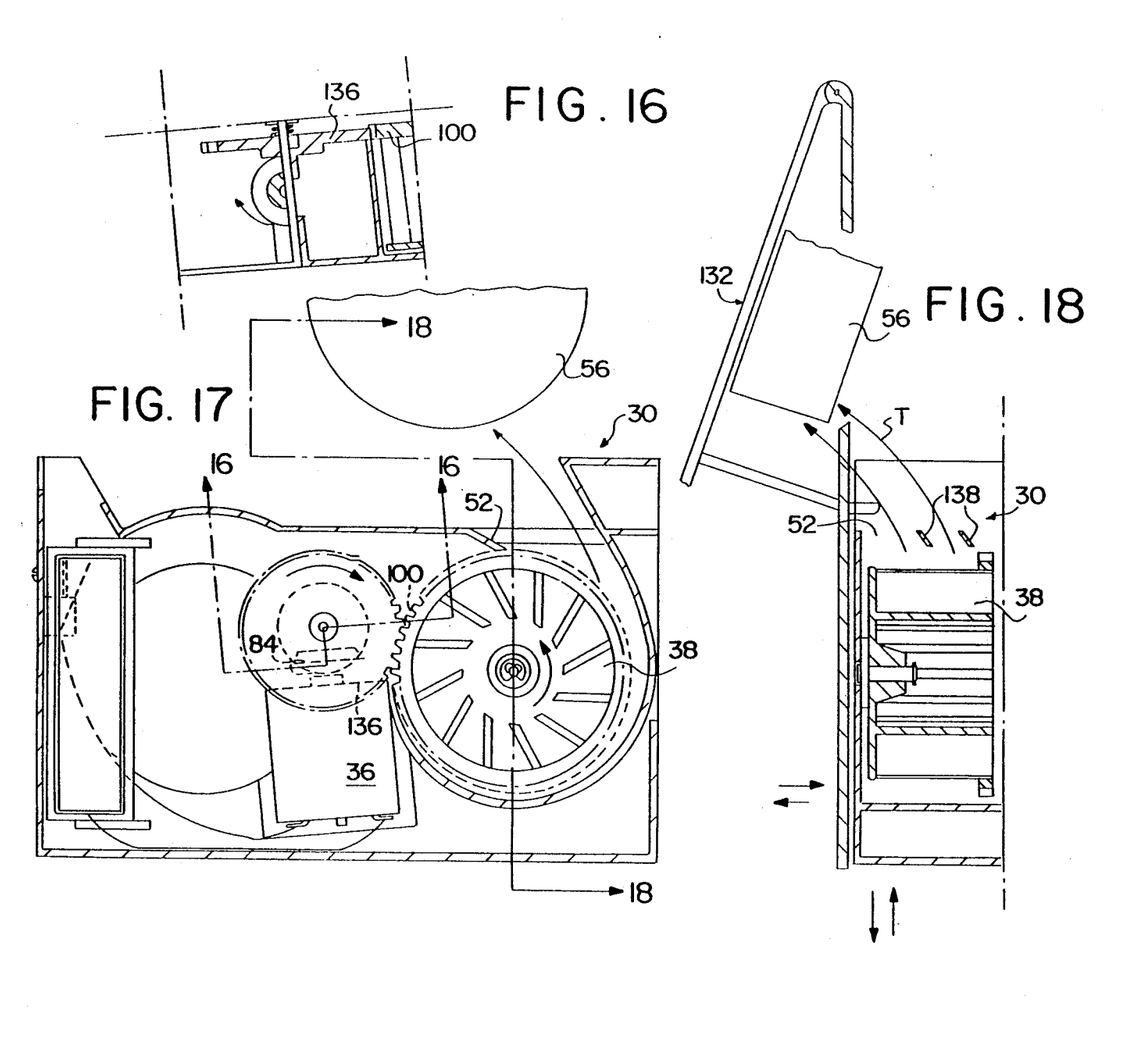
FIG. 16 is a fragmentary sectional side view of another embodiment of a drying cassette according to the invention taken substantially along the line 16—16 in FIG. 17.
FIG. 17 is a schematic plan view of the drying cassette illustrated in FIG. 16.
FIG. 18 is a sectional view of the drying cassette shown in FIG. 17 in an operating position in a camera/recorder unit with the loading door open, and is taken substantially along the lines of 18—18 in FIG. 17.

Two different drying cassette embodiments are shown, respectively, in FIGS. 16–18 and FIGS. 19–21. In FIGS. 16–18 a drying cassette 30 is illustrated having a cassette housing similar to a VHS-C cassette for camcorder use, while in FIGS. 19–21 the drying cassette 30 is contained within a cassette housing similar to an 8 mm cassette for camcorders. In both embodiments, the fan 38 is driven from an electric motor mounted in the cassette housing, and the motor is connected to rotate the fan 38 through a drive including a rubber wheel 84 on the output shaft of the motor and an intermediate gear 136 which meshes with a toothed rim 100 of the fan 38. In both embodiments, a source of power is provided in the form of a battery 42 connected through a circuit to the motor.

As previously noted, it is desirable that in the case of camcorder units, the drying cassette be operated when the loading door of the unit is in an open position. It is so shown in both FIGS. 18 and 21. So as to direct forced air generated by the fan 38 toward the rotating magnetic head assembly 56, in the VHS-C embodiment shown in FIGS. 16–18, deflectors 138 are provided adjacent the outlet opening 52 from the cassette housing so that the flow of air is directed angularly from the drying cassette 30 toward the rotating magnetic head assembly 56, as shown in FIG. 18.

Figures 19, 20:
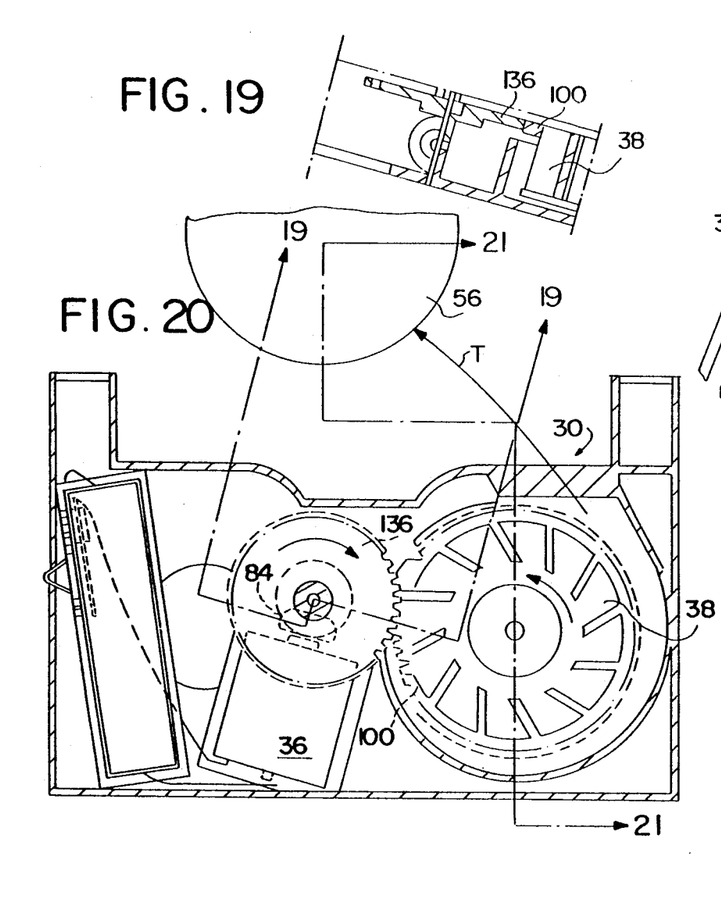
FIG. 19 is a fragmentary sectional side view of another embodiment of a drying cassette according to the invention taken substantially along the line 19—19 in FIG. 20.
FIG. 20 is a schematic plan view of the drying cassette illustrated in FIG. 19.
Figure 21:
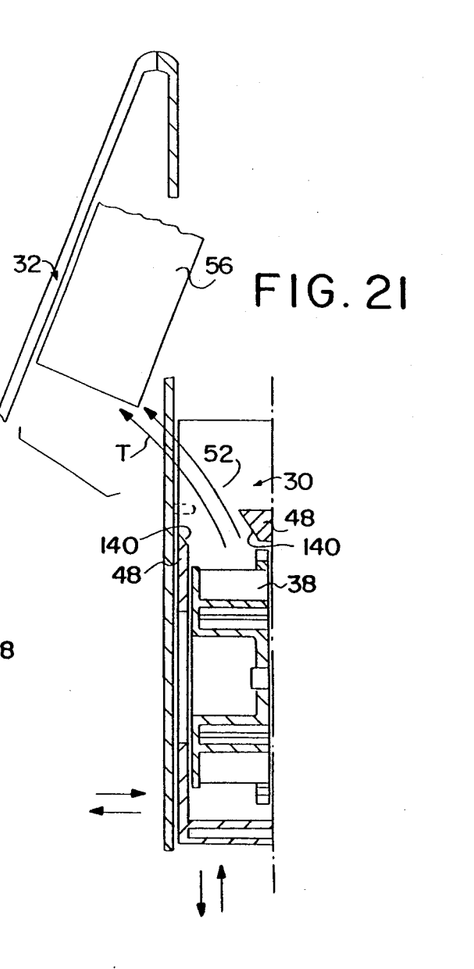
FIG. 21 is a sectional view taken along the lines 21—21 of the drying cassette embodiment illustrated in FIG. 20.

While deflectors 138 are provided in the embodiment of the invention illustrated in FIGS. 16–18, in the 8 mm-type drying cassette 30 shown in FIGS. 19–21, the walls 48 of the drying cassette housing have inclined surfaces 140 which direct the forced air generated by the fan 38 through the outlet opening 52 toward the rotating magnetic head assembly 56, shown in FIG. 21.

While a battery is shown in FIG. 20, if required space is not available within the standard cassette housing of the smaller type such as are used for certain types of video cameras, a power cord may be provided to connect the motor to a DC or AC-converted power supply or, alternatively, the cassette housing may be enlarged to accommodate a battery but such a cassette will not be fully inserted in the unit for operation.

For obtaining most efficient drying, it is preferred to have a fan rotor which is substantially equal in height to the total height of the drying cassette housing which corresponds substantially in height to the video head assembly. Thus, the rotor of the fan 38 extends vertically between the top wall 62 and the bottom wall 63 of the drying cassette housing having running clearance with the walls so that the fan can freely rotate. The fan height substantially equal to the cassette housing is shown in the embodiments of FIGS. 5–21.

It is conventional in commercial camcorder and other units to provide a "dew detector", a variable resistor the resistance of which is adjusted proportional to dew level, i.e., % relative humidity. The resistor is connected to a circuit measuring voltage across the resistor and in case of a VHS/or VHS-C unit, two threshold levels are set so that, when measured voltage is below the lower one, the unit can be used, when measured voltage is above the upper one, the unit cannot be operated before the voltage returns below the lower threshold. In some units such as 8 mm camcorders only one level is detected (±3 volts) and use of the unit is allowed when measured voltage is below the level and is, prevented when measured voltage is above.

Figure 23:
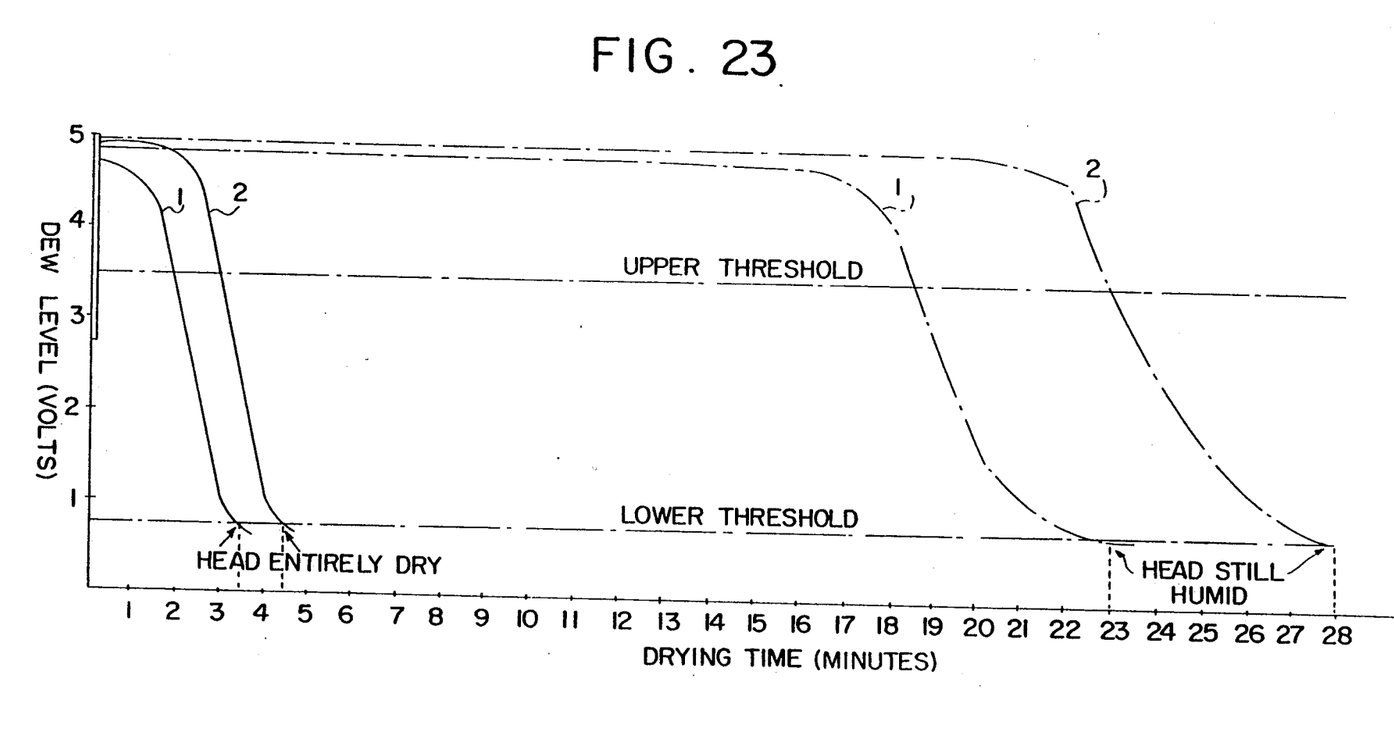
FIG. 23 is a diagram illustrating characteristic drying curves showing moisture conditions in a player/recorder unit versus drying times with and without a drying cassette.

Finally, reference is directed to FIG. 23 which has characteristic drying curves illustrating the relationship between drying time and moisture level in terms of output volts of a sensor within a VCR unit. The following table describes the measurement conditions within a portable camcorder used for the test for two different temperatures between a cold unit (at 4° C.) when brought into high humidity environment (70%). In curve (1) the external temperature was 22° C. while in curve 2 the external temperature was 24° C.

| | Measurement Conditions | | |
|---|---|---|---|
| External Humidity | External Temp. | Temperature of Unit | Δ of Temp. |
| 1 70% | 22° C. | 4° C. | 18° C. |
| 2 70% | 24° C. | 4° C. | 20° C. |

It will be seen that with a drying cassette the drying time with an external temperature of 22° C. was approximately 3½ minutes versus 23 minutes not using a drying cassette. When the external temperature was 24° C., the drying time was approximately 4½ minutes using a drying cassette versus about 28 minutes not using a drying cassette.

The tests were conducted as follows for obtaining the data given in FIG. 23 using a VHS-C cassette on a JVC camcorder; similar results were obtained with a 8 mm cassette and camcorder.

1. The cassette and camcorder units were stored for one or two hours in a cold room having conditions specified in the above table;

2. The cold units were then removed and placed in a room with the warm, high humidity conditions to obtain a difference of temperature of ±18° C.; the loading door was open and the standard cassette loaded in the door;

3. Output of the above-described "dew" circuit was connected to an oscilloscope and measurements of voltage performed automatically to obtain curves (in dash-dotted lines—experiments 1 and 2); heads were then visually inspected;

4. To obtain the data using the drying cassettes, steps 1 and 2 were repeated, then a drying cassette was loaded in the camcorder unit; the output of the "dew" circuit was again measured as described in step 3 to obtain curves in full line (experiments 1 and 2). Heads were then visually inspected.

It was observed that with the use of the drying cassette, the heads were totally dry when inspected after the dew detector switched off, while without a drying cassette, the heads were still humid and, thus, a VCR and tape would be damaged if immediately put in operation. This is why "instruction manuals" of VCRs generally stipulate that after the dew level warning indicator has been switched off, the user should not operate the VCR and load any cassette before at least 30 to 40 minutes have elapsed, another very important drawback that the present invention overcomes.

I claim:

1. A drying cassette for a tape recorder/player unit having a rotating head assembly, a tape drive mechanism, and a loading mechanism for receiving a tape cassette and moving the tape cassette between an exterior loading position and an interior operating position in said unit wherein the tape drive mechanism penetrates the tape cassette, said drying cassette comprising, a cassette housing which has a configuration that allows it to be movable by the cassette loading mechanism between the exterior loading position and the interior operating position, said cassette housing having top and bottom walls, said bottom walls having openings which allow the tape drive mechanism to penetrate said cassette housing when in the interior operating position, a fan within said cassette housing, said fan having a rotor with an axis of rotation perpendicular to said top and bottom walls, and members carried by said cassette housing which direct forced air generated by said fan from said cassette housing in a predetermined direction toward the rotating head assembly when said drying cassette is located in the loading mechanism, whereby air is circulated over surfaces of the rotating head assembly to dry moisture on the surfaces.

2. A drying cassette according to claim 1, said fan having a drive member mounted concentrically with respect to one of the openings, said drive member being engageable to be driven by a reel drive spindle when said cassette housing is in the interior operating position in said unit, and a drive connecting said drive member to rotate said fan.

3. A drying cassette according to claim 1, said fan rotor being mounted concentrically with respect to one of said openings.

4. A drying cassette according to claim 3, said drying cassette housing having top and bottom walls, said fan rotor extending vertically between said top and bottom walls and having clearance therewith, whereby said fan rotor has a height substantially equal to said drying cassette housing which corresponds substantially in height to the video head assembly.

5. A drying cassette according to claim 1 including an electric motor connected to operate said fan and a battery mounted in said cassette housing and connected to operate said motor.

6. A drying cassette according to claim 5 further including a circuit connected between said motor and said battery, said circuit including a switch operated automatically when said drying cassette is in the loading mechanism to turn said motor on and operate said fan.

7. A drying cassette according to claim 6 wherein said circuit includes two switches connected in parallel, one of said switches being a manually operated switch.

8. A drying cassette according to claim 6 wherein said control circuit includes a switch to start said motor and a time delay device to stop said motor after the lapse of predetermined drying time.

9. A cleaning and drying cassette for a video recorder/player having a magnetic recording head, and adapted to receive a video cassette which contains tape that engages said head, said cleaning and drying cassette comprising, a cassette housing shaped to be received in the recorder/player unit, said cassette housing having top and bottom walls, a cleaning tape to carry cleaning liquid and a mechanism mounted in said cassette housing to position said cleaning tape to apply liquid to the magnetic head during a cleaning cycle, a fan carried by said cassette housing, said fan having a fan rotor with an axis of rotation which extends perpendicular to said top and bottom walls, and members carried by said cassette housing which direct air flowing from said fan toward the magnetic head during a drying cycle, whereby air is circulated over a surface of the magnetic head to dry cleaning liquid on the surface in the drying cycle conducted after the cleaning cycle.

10. A cleaning and drying cassette for a tape recorder/player unit having a rotating magnetic head assembly, and adapted to receive a tape cassette which contains tape that engages the rotating magnetic head assembly, said cleaning and drying cassette comprising, a cassette housing receivable in an interior operating position in the recorder/player unit, said fan having top and bottom walls, a cleaning tape movably mounted in said cassette housing to carry and apply cleaning liquid to the rotating magnetic head assembly during a cleaning cycle, a fan within said cassette housing, said fan having a fan rotor with an axis of rotation which extends perpendicular to said top and bottom walls, and an outlet opening in said cassette housing which directs forced air generated by said fan toward the assembly during a drying cycle, whereby air is circulated over surfaces of the assembly to dry cleaning liquid on the surfaces in the drying cycle when conducted after the cleaning cycle.

11. A cleaning and drying cassette according to claim 10 wherein said cassette housing includes an automatic clutch in said tape positioning mechanism which slackens the cleaning tape at the end of the cleaning cycle when the tape is brought back into the cassette housing, in order to not slow down rotation of the magnetic head.

12. In combination:

a tape recorder/player unit having a rotating head assembly, a loading device including a pivotable loading door which receives a tape cassette in an open loading position and pivots to a closed position to move the tape cassette to an interior operating position associated with said rotating head assembly; and a drying cassette to be used in a tape recorder/player unit including a cassette housing adapted to be received in said loading device in the open position of said loading door and movable by said loading device to the interior operating position with said loading door closed, said cassette housing having top and bottom walls, a fan mounted within said cassette housing, said fan having a fan rotor with an axis of rotation perpendicular to said top and bottom walls a motor mounted in said cassette housing connected to rotate said fan, a control circuit connecting said motor to a power source including a switch to start said motor when said drying cassette is in either the loading position or in the operating position.

13. A drying cassette for circulating drying air over a rotating head assembly and other internal components of a video tape recorder (VTR) unit, said drying cassette comprising;

a cassette housing having top and bottom walls, a side wall, and a transverse center line dividing the cassette housing into a first half and a second half, the cassette housing having an exterior configuration which is movable in the VTR unit between an exterior loading position and interior loaded position, a fan rotor mounted in the first half of the housing with an axis extending perpendicular to the top and bottom walls and blades which extend radially from the axis, an outlet opening in the side wall of the housing to convey forced air produced by rotation of said fan rotor and blades along a path laterally spaced form the center line in the first half of the housing and aligned with a peripheral portion of the rotating head assembly of the VTR when the cassette is in the interior loaded position and the fan is driven, and drive means mounted in the cassette housing to drive the fan and force air through the outlet opening.

14. A drying cassette according to claim 13 wherein said drive means includes a motor and battery mounted within the cassette housing and connected to drive the fan and force drying air through the outlet opening when the cassette housing is in either the exterior or the interior position.

15. A drying cassette according to claim 14 wherein said drive means includes a drive connection from the motor to the fan rotor, and at least one of said drive motor, drive connection and battery is located in the second half of the cassette housing.

16. A drying cassette according to claim 13 having the fan rotor axis substantially centered in the first half of the housing and aligned with an opening in the bottom wall located to receive a drive spindle of the VTR unit, the fan rotor having clearance with the drive spindle when the cassette housing is in the interior position, a drive member mounted in the cassette housing substantially centered in the second half thereof and located to receive a second drive spindle of the VTR unit when the cassette housing is in the interior position, and a drive connection from the drive member to drive the fan from the second drive spindle.

17. A drying cassette according to claim 13 wherein said drive means includes a motor and battery, and wherein said drive motor and fan rotor are located in axial alignment in the first half of the cassette housing, and the battery is located in the second half of the cassette housing and is connected by a circuit to the drive motor.

18. A drying cassette according to claim 13 further including a cleaning tape in said cassette housing to carry and apply cleaning liquid to the rotating head assembly during a cleaning cycle, and means for moving and guiding the cleaning tape through the cassette housing around the fan rotor and behind the outlet opening so as not to block passage of drying air from the fan rotor through the outlet opening toward the VTR unit components, whereby both a cleaning and a drying cycle may be conducted with the drying cassette.

19. A drying cassette according to claim 13 wherein said cassette housing includes an air intake opening positioned to receive intake air, and an outlet opening located to direct forced air generated by said fan toward the rotating head assembly when said drying cassette is in the loading position or in the operating position.

20. The combination according to claim 19 wherein said cassette housing includes deflectors to guide the forced air toward the rotating head assembly when said drying cassette is in either position.

21. The combination according to claim 20 wherein said cassette housing includes deflectors to guide the forced air toward the rotating head assembly and said deflectors are movably mounted between a first position when said cassette housing is in the loading position and a second position when said cassette housing is in the operating position.

22. The combination according to claim 13 wherein said cassette housing includes deflectors to guide the forced air toward the rotating head assembly and said deflectors are movably mounted between a first position when said cassette housing is in the loading position and a second position when said cassette housing is in the operating position.

23. The combination according to claim 22 including means in said cassette housing cooperating with means of said unit for automatically moving said deflectors to the second position responsive to movement of said cassette housing to the operating position.

* * * * *